(12) United States Patent
Simon et al.

(10) Patent No.: US 9,759,110 B2
(45) Date of Patent: Sep. 12, 2017

(54) DEVICE AND METHOD FOR CLEANING OF AN SCR SYSTEM

(71) Applicant: Scania CV AB, Södertälje (SE)

(72) Inventors: Anders Simon, Södertälje (SE); Mikael Lundström, Hägersten (SE)

(73) Assignee: SCANIA CV AB (SE)

( * ) Notice: Subject to any disclaimer, the term of this patent is extended or adjusted under 35 U.S.C. 154(b) by 356 days.

(21) Appl. No.: 14/386,486

(22) PCT Filed: Mar. 18, 2013

(86) PCT No.: PCT/SE2013/050289
§ 371 (c)(1),
(2) Date: Sep. 19, 2014

(87) PCT Pub. No.: WO2013/141793
PCT Pub. Date: Sep. 26, 2013

(65) Prior Publication Data
US 2015/0047325 A1   Feb. 19, 2015

(30) Foreign Application Priority Data

Mar. 22, 2012 (SE) ...................................... 1250285

(51) Int. Cl.
*F01N 3/00* (2006.01)
*F01N 3/20* (2006.01)
*F01N 11/00* (2006.01)

(52) U.S. Cl.
CPC ........... *F01N 3/208* (2013.01); *F01N 3/2006* (2013.01); *F01N 11/00* (2013.01);
(Continued)

(58) Field of Classification Search
CPC ........ F01N 11/00; F01N 3/2006; F01N 3/208; F01N 2430/00; F01N 2550/02;
(Continued)

(56) References Cited

U.S. PATENT DOCUMENTS

2008/0271440 A1   11/2008   Xu et al. ......................... 60/295
2009/0025368 A1   1/2009   Sakimoto et al. .............. 60/285
(Continued)

FOREIGN PATENT DOCUMENTS

GB   2 448 993 A   11/2008

OTHER PUBLICATIONS

International Search Report mailed Jun. 26, 2013 in corresponding PCT International Application No. PCT/SE2013/050289.

*Primary Examiner* — Phutthiwat Wongwian
*Assistant Examiner* — Matthew T Largi
(74) *Attorney, Agent, or Firm* — Ostrolenk Faber LLP

(57) ABSTRACT

A method for cleaning an SCR system, wherein reducing agent is supplied to an exhaust flow upstream of an SCR catalyst (260), $NO_X$ contents of the exhaust flow are determined upstream and downstream of the SCR catalyst (260) and reducing agent crystals are removed by a high-temperature procedure. The steps are determining (s430) a ratio (K1) between $NO_X$ contents downstream and upstream of the SCR catalyst (260), raising the temperature (s440) of the exhaust flow to vaporize reducing agent crystals with a view to cleaning, determining (s450) a ratio (Kn) between respective $NO_X$ contents determined downstream and upstream of the SCR catalyst (260) at a temperature (T2) of the SCR catalyst (260) at which reducing agent crystals vaporize, comparing (s460) the ratios (K1, Kn) and using this comparison as a basis for deciding whether reducing agent crystals have been removed to an intended extent. Also a computer program product containing program code (P) for a computer (200; 210) for implementing the method according to the invention. The invention relates also to a device and a motor vehicle equipped with the device.

18 Claims, 5 Drawing Sheets

(52) U.S. Cl.
CPC ...... *F01N 2430/00* (2013.01); *F01N 2550/02* (2013.01); *F01N 2560/026* (2013.01); *F01N 2560/06* (2013.01); *F01N 2560/14* (2013.01); *F01N 2610/02* (2013.01); *F01N 2900/0416* (2013.01); *F01N 2900/1621* (2013.01); *Y02T 10/24* (2013.01); *Y02T 10/26* (2013.01)

(58) Field of Classification Search
CPC ........... F01N 2560/026; F01N 2560/06; F01N 2560/14; F01N 2610/02; F01N 2900/0416; F01N 2900/1621
See application file for complete search history.

(56) References Cited

U.S. PATENT DOCUMENTS

| | | | |
|---|---|---|---|
| 2009/0056310 A1* | 3/2009 | Xu | F01N 3/035 60/274 |
| 2010/0122525 A1 | 5/2010 | Fujita et al. | 60/285 |
| 2011/0030343 A1 | 2/2011 | Kiser et al. | 60/274 |
| 2011/0146240 A1 | 6/2011 | Wilhelm et al. | 60/274 |
| 2011/0167805 A1* | 7/2011 | Chen | F01N 3/023 60/286 |

* cited by examiner

DEVICE AND METHOD FOR CLEANING OF AN SCR SYSTEM

CROSS-REFERENCE TO RELATED APPLICATIONS

The present application is a 35 U.S.C. §§371 National Phase conversion of PCT/SE2013/050289, filed Mar. 18, 2013, which claims priority of Swedish Patent Application No. 1250285-2, filed Mar. 22, 2012, the contents of which are incorporated by reference herein. The PCT International Application was published in the English language.

TECHNICAL FIELD

The present invention relates to a method for cleaning an SCR system. The invention relates also to a computer programme product comprising programme code for a computer for implementing a method according to the invention. It relates also to a device for cleaning an SCR system and a motor vehicle equipped with the device.

BACKGROUND

Vehicles today use, for example, urea as reducing agent in SCR (selective catalytic reduction) systems which comprise an SCR catalyst in which said reducing agent and NOx gas can react and be converted to nitrogen gas and water. Various types of reducing agents may be used in SCR systems. AdBlue is an example of a commonly used reducing agent.

One type of SCR system comprises a container which holds a reducing agent. The system has also a pump adapted to drawing said reducing agent from the container via a suction hose and supplying it via a pressure hose to a dosing unit situated adjacent to an exhaust system of the vehicle, e.g. adjacent to an exhaust pipe of the exhaust system. The dosing unit is adapted to injecting a necessary amount of reducing agent into the exhaust pipe upstream of the SCR catalyst according to operating routines which are stored in a control unit of the vehicle. To make it easier to regulate the pressure when there are small or no dosing amounts, the system comprises also a return hose which runs back to the container from a pressure side of the system.

The SCR catalyst in the vehicle's exhaust duct comprises inter alia a vaporisation module and a portion with an SCR substrate. Said vaporisation portion is adapted to vaporising dosed reducing agent in order to achieve better mixing between the exhaust gases and said dosed reducing agent.

In cases where not all of the dosed reducing agent is vaporised, precipitates of it may form, normally consisting of crystals which attach themselves to one or more parts of the vaporisation module. With continued dosing of reducing agent these crystals may build up further and are likely to lead to undesirable consequences. The problem of the build-up of reducing agent crystals in SCR systems of motor vehicles is well known.

One cause of said undesirable build-up of reducing agent crystals may be that the vaporisation capacity of the vaporisation module in certain operating situations is overestimated. Said reducing agent crystals may also be referred to as urea stones.

There are a number of problems associated with build-up of urea stones in the SCR catalyst's vaporisation module.

Firstly, an exhaust backpressure may increase in the engine's exhaust system, imposing a greater load upon the engine and thereby forcing it to work unnecessarily hard, at undesirably high load.

Secondly, a degree of conversion by the SCR catalyst may be impaired, causing an increase in undesirable emissions from the vehicle.

Thirdly, in cases where build-up of urea stones is not prevented the exhaust system may eventually become totally obstructed, completely preventing the passing of an exhaust flow.

SUMMARY OF THE INVENTION

One object of the present invention is to propose a novel and advantageous method for cleaning an SCR system.

Another object of the invention is to propose a novel and advantageous device and a novel and advantageous computer programme for cleaning an SCR system.

A further object of the invention is to propose a user-friendly and reliable method for cleaning an SCR system.

A further object of the invention is to propose a workshop method for cleaning an SCR system.

A further object of the invention is to propose an alternative method, an alternative device and an alternative computer programme for cleaning an SCR system.

These objects are achieved with a method for cleaning an SCR system according to the disclosure herein.

One aspect of the invention is a proposed method for cleaning an SCR system whereby reducing agent is supplied to an exhaust flow upstream of an SCR catalyst, $NO_x$ contents of the exhaust flow are determined upstream and downstream of said catalyst, and reducing agent crystals are removed by a high-temperature procedure. The method comprises the steps of determining a ratio between respective $NO_X$ contents determined downstream and upstream of said catalyst at a temperature of said catalyst at which reducing agent crystals do not vaporise, raising the temperature of the exhaust flow in order to vaporise reducing agent crystals with a view to cleaning, determining a ratio between respective $NO_X$ contents determined downstream and upstream of said catalyst at a temperature of said catalyst at which reducing agent crystals vaporise, comparing said ratios and using this comparison as a basis for deciding whether reducing agent crystals have been removed to an intended extent.

Said $NO_X$ content upstream of the SCR catalyst may in one version be measured by an $NO_x$ sensor. It may in one version be calculated according to a model stored in a control unit of the vehicle. In one example it may be determined on the basis of information about a prevailing operating point of the engine.

The method may further comprise the step of conducting, when a need is determined, at least one further cycle of cleaning, determination and comparison. A suitable number of such cycles may thus be conducted.

Cleaning may take place at a higher temperature than that at which said ratio is determined and reducing agent crystals vaporise. A time-efficient cleaning method for an SCR system is thus achieved.

The step of determining said ratio at the temperature at which reducing agent crystals do not vaporise may take place after initiation of temperature rise. A time-efficient cleaning method for an SCR system is thus achieved.

The step of determining said ratio at the temperature at which reducing agent crystals vaporise may take place under predetermined conditions at each determination of said NO$_X$ contents. Said predetermined conditions may pertain to a certain desirable operating point of the SCR system. An engine associated with the SCR system may thus be guided to a desirable operating point, e.g. by influencing an engine speed and exhaust backpressure. An effective form of regulation of the engine's operating point, and hence a temperature of the SCR catalyst, is thus achieved. By altering operating points of the engine it is possible to control a temperature of the exhaust flow, which temperature influences a prevailing temperature of the SCR catalyst.

Said reducing agent may be a urea-based reducing agent, e.g. AdBlue.

Said cleaning may be conducted over a predetermined period of time which might be 20, 30, 60 or 100 minutes.

The method is easy to implement in existing motor vehicles. Software for cleaning an SCR system according to the invention may be installed in a control unit of the vehicle during the manufacture of the vehicle. A purchaser of the vehicle may thus have the possibility of selecting the function of the method as an option. Alternatively, software which comprises programme code for conducting the innovative method for cleaning an SCR system may be installed in a control unit of the vehicle on the occasion of upgrading at a service station, in which case the software may be loaded into a memory in the control unit. Implementing the innovative method is therefore cost-effective, particularly since no further components need be installed in the vehicle. The invention therefore represents a cost-effective solution to the problems indicated above.

Software which comprises programme code for cleaning an SCR system is easy to update or replace. Moreover, different parts of the software which comprises programme code for cleaning an SCR system may be replaced independently of one another. This modular configuration is advantageous from a maintenance perspective.

One aspect of the invention is a proposed device for cleaning an SCR system whereby reducing agent is supplied to an exhaust flow upstream of an SCR catalyst, NO$_x$ contents of the exhaust gases are determined upstream and downstream of said catalyst, and reducing agent crystals are removed by subjecting the exhaust flow to a high-temperature procedure. The device comprises means for determining a ratio between respective NO$_X$ contents determined downstream and upstream of said SCR catalyst at a temperature at which reducing agent crystals do not vaporise, means for raising the temperature of the exhaust flow in order to vaporise reducing agent crystals with a view to cleaning, means for determining a ratio between respective NO$_X$ contents determined downstream and upstream of said catalyst at a temperature at which reducing agent crystals vaporise, means for comparing said ratios as a basis for deciding whether reducing agent crystals have been removed to an intended extent.

The device may comprise means for conducting, when a need is determined, at least one further cycle of cleaning, determination and comparison.

The device may comprise means for effecting cleaning at a higher temperature than that at which said ratio is determined and reducing agent crystals vaporise.

The device may comprise means for determining said ratio at the temperature at which reducing agent crystals do not vaporise after initiation of temperature rise.

The device may comprise means for determining said ratio at the temperature at which reducing agent crystals vaporise under predetermined conditions at each determination of said NO$_X$ contents.

The device may comprise means for conducting said cleaning over a predetermined period of time.

The above objects are also achieved with a motor vehicle which is provided with the device for cleaning an SCR system. The vehicle may a truck, bus or car.

One aspect of the invention is a proposed computer program for cleaning an SCR system, which program comprises program code stored on a computer-readable medium for causing an electronic control unit or another computer connected to the electronic control unit to perform steps according to the invention disclosed herein.

One aspect of the invention is a proposed computer program for cleaning an SCR system, which program comprises programme code for causing an electronic control unit or another computer connected to the electronic control unit to perform steps according to the invention disclosed herein.

One aspect of the invention is a proposed computer program product comprising a program code stored on a computer-readable medium for performing method steps according to the invention disclosed herein when the computer program is run on an electronic control unit or another computer connected to the electronic control unit.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognise further applications, modifications and incorporations within other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations pertain to similar items in the various diagrams and FIG. 1 schematically illustrates a vehicle according to an embodiment of the invention, FIG. 2a schematically illustrates a subsystem for the vehicle depicted in FIG. 1, according to an embodiment of the invention, FIG. 2b schematically illustrates a subsystem for the vehicle depicted in FIG. 1, according to an embodiment of the invention.

DETAILED DESCRIPTION OF THE DRAWINGS

Figure 1:
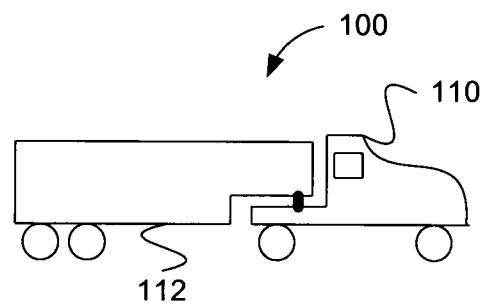

FIG. 1 depicts a side view of a vehicle 100. The vehicle here exemplified comprises a tractor unit 110 and a trailer 112. It may be a heavy vehicle, e.g. a truck or a bus. It may alternatively be a car.

It should be noted that the invention is suitable for application in any SCR system and is therefore not restricted to SCR systems of motor vehicles. The innovative method and the innovative device according to one aspect of the invention are well suited to other platforms which comprise an SCR system than motor vehicles, e.g. watercraft. The watercraft may be of any kind, e.g. motorboats, steamers, ferries or ships.

The innovative method and the innovative device according to one aspect of the invention are for example also well suited to systems which comprise industrial engines and/or engine-powered industrial robots.

The innovative method and the innovative device according to one aspect of the invention are also well suited to various kinds of power plants, e.g. an electric power plant provided with an engine-powered generator.

The innovative method and the innovative device are well suited to any engine system which comprises an engine and an SCR system, e.g. on a locomotive or some other platform.

The innovative method and the innovative device are well suited to any system which comprises an $NO_x$ generator and an SCR system.

The term "link" refers herein to a communication link which may be a physical connection such as an opto-electronic communication line, or a non-physical connection such as a wireless connection, e.g. a radio link or microwave link.

The term "line" refers herein to a passage for holding and conveying a fluid, e.g. a reducing agent in liquid form. The line may be a pipe of any size and be made of any suitable material, e.g. plastic, rubber or metal.

The term "reducing agent" refers herein to an agent used for reacting with certain emissions in an SCR system. These emissions may for example be $NO_x$ gas. Another term for said reducing agent is "reductant". The terms "reductant" and "reducing agent" are herein used synonymously. Said reducing agent in one version is so-called AdBlue. Other kinds of reducing agent may of course be used. AdBlue is herein cited as an example of a reducing agent, but one skilled in the art will appreciate that the innovative method and the innovative device are feasible with other types of reducing agent.

The possibility that reducing agent in the SCR system may form undesirable reducing agent crystals is herein described. These reducing agent crystals may also be called urea clumps, urea stones or urea precipitates.

Reducing agent crystals may form if an engine and an associated SCR system are run at an unsuitable operating point with regard to temperature and exhaust flow over a certain time, causing more reducing agent to be dosed than can be vaporised. This may result in accumulation of reducing agent in the exhaust system, e.g. in a vaporisation module of the SCR catalyst or in the silencer of the exhaust system. Such accumulation of reducing agent is initially in liquid form, but continued operation of the engine and the SCR system at unsuitable operating points may result in its solidifying and forming a so-called urea precipate which may quickly increase in size during continued operation of the engine and the SCR system.

Said reducing agent crystals may largely consist of urea, but various types of more or less stable deposits may occur and may for example contain CYA (cyanuric acid) and in certain cases even ammelide.

The colour of said reducing agent crystals may indicate their composition. In principle the darker their colour the more stable their constituent urea by-products and the higher the temperature required for successful removal of the crystals by burning out.

The regions of the reducing agent crystals where precipitation is initiated are often darker in colour, whereas the subsequent build-up layers are lighter.

Figure 2A:
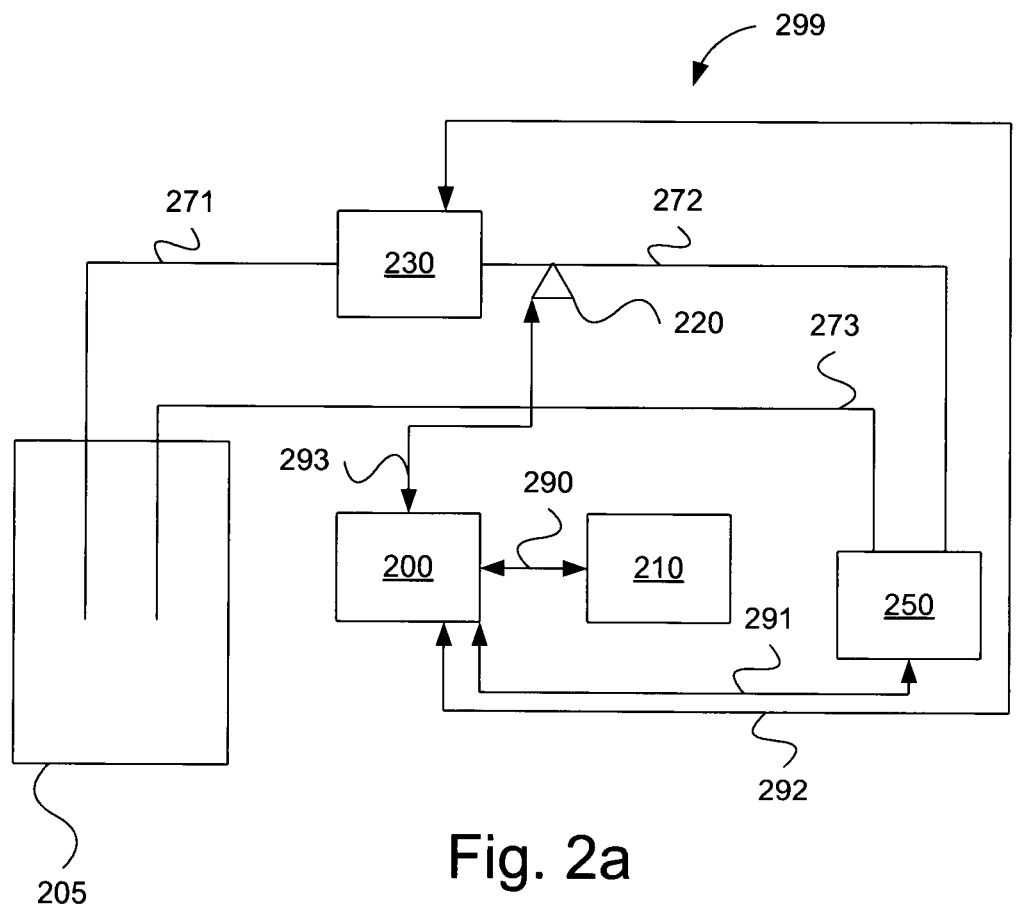

FIG. 2a depicts a subsystem 299 of the vehicle 100. It is situated in the tractor unit 110. It may be part of an SCR system and comprises in this example a container 205 arranged to hold a reducing agent in liquid form. Said container is adapted to containing a suitable amount of reducing agent and also to being replenishable as necessary. It might for example accommodate 75 or 50 liters of reducing agent.

A first line 271 is provided to lead the reducing agent to a pump 230 from the container 205. The pump may be any suitable pump. It may be adapted to being driven by an electric motor (not depicted). It is adapted to drawing the reducing agent from the container 205 via the first line 271 and supplying it via a second line 272 to a dosing unit 250. The dosing unit comprises an electrically operated dosing valve by means of which a flow of reducing agent added to the exhaust system can be controlled. The pump 230 is adapted to pressurising the reducing agent in the second line 272. The dosing unit 250 is provided with a throttle unit against which said pressure of the reducing agent builds up in the subsystem 299.

The dosing unit 250 is adapted to supplying said reducing agent to an exhaust system of the vehicle 100. The exhaust system is referred to in more detail with reference to FIG. 2b below. More specifically, the dosing unit is adapted to supplying a suitable amount of reducing agent in a controlled way to an exhaust system of the vehicle. In this version, an SCR catalyst (see FIG. 2b) is provided downstream of a location in the exhaust system where the supply of reducing agent takes place.

The dosing unit 250 is situated adjacent to, for example, an exhaust pipe 241 which is provided to lead exhaust gases from a combustion engine 240 (see FIG. 2b) of the vehicle 100 to the SCR catalyst 260.

A third line 273 runs between the dosing unit 250 and the container 205 and is adapted to leading back to the container a certain amount of the reductant fed to the dosing valve 250. This configuration results in advantageous cooling of the dosing unit.

A first control unit 200 is arranged for communication with a pressure sensor 220 via a link 293. The sensor is adapted to detecting a prevailing pressure of the reductant at the location where the sensor is fitted. In this version said sensor is situated adjacent to the second line 272 to measure a working pressure of the reductant downstream of the pump 230. It is adapted to continuously sending signals to the first control unit 200 which contain information about a prevailing pressure of the reductant.

The first control unit 200 is arranged for communication with the pump 230 via a link 292. It is adapted to controlling the operation of the pump in order, for example, to regulate the flows of reductant within the subsystem 299. It is adapted to controlling an operating power of the pump by regulating the associated electric motor.

The first control unit 200 is arranged for communication with the dosing unit 250 via a link 291. It is adapted to controlling the operation of the dosing unit in order, for example, to regulate the supply of reductant to the vehicle's exhaust system. It is adapted to controlling the operation of the dosing unit in order, for example. to regulate the return supply of the reductant to the container 205.

A second control unit 210 is arranged for communication with the first control unit 200 via a link 290. It may be detachably connected to the first control unit. It may be external to the vehicle. It may be adapted to performing the innovative method steps according to the invention. It may be used to cross-load software to the first control unit, particularly software for conducting the innovative method. It may alternatively be arranged for communication with the first control unit via an internal network in the vehicle. It may be adapted to performing functions substantially similar to the first control unit.

The innovative method may be conducted by the first control unit 200 or the second control unit 210 or by both of them, in which case the first control unit may effect certain parts of the innovative method and the second control unit certain other parts.

The second control unit 210 may be a computer which workshop staff use during servicing of vehicles. This may involve workshop staff connecting the second control unit to an internal network on board the vehicle and conducting the innovative burn-out method.

Figure 2B:
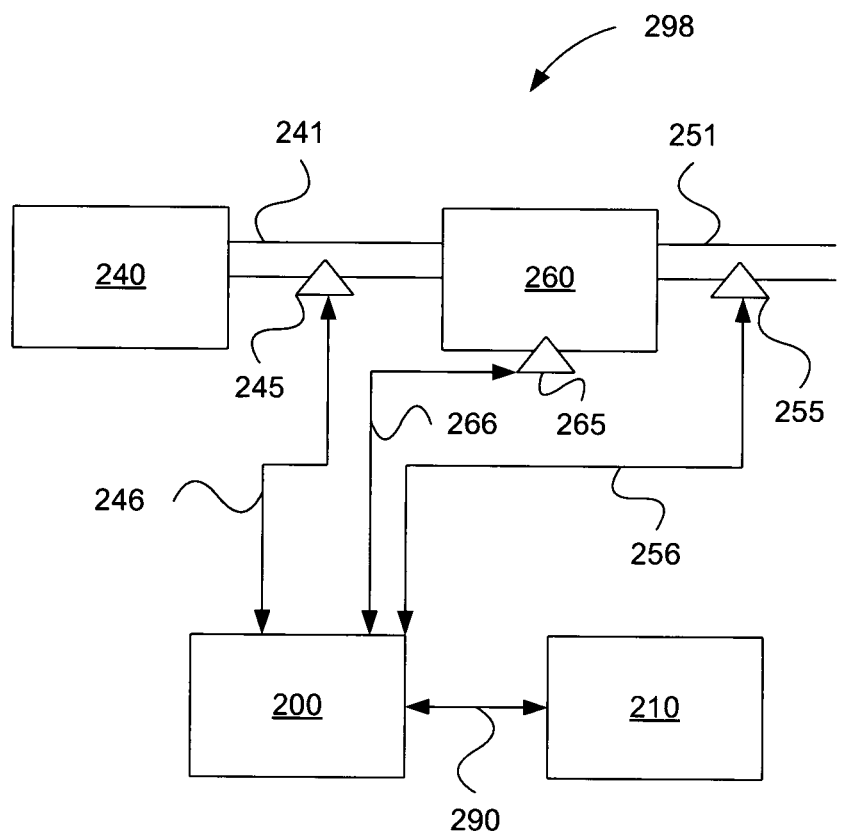

FIG. 2*b* depicts a subsystem 298 of the vehicle 100. It is situated in the tractor unit 110 and may be part of an SCR system. It comprises in this example a combustion engine 240 and a first exhaust passage 241 adapted to leading an exhaust flow generated by the engine to an SCR catalyst 260 which may be incorporated in a silencer of the vehicle 100 in a conventional way. In addition, a second exhaust passage 251 is provided to lead the exhaust flow to the vehicle's surroundings.

A first $NO_x$ sensor 245 is provided adjacent to the first exhaust passage 241 and is adapted to measuring a prevailing $NO_x$ content in the first exhaust passage. It is adapted to measuring a prevailing $NO_x$ content in the first exhaust passage upstream of the SCR catalyst 260. This first $NO_x$ sensor is arranged for communication with the first control unit 200 via a link 246. It is adapted to sending signals to the first control unit which contain information about a prevailing $NO_x$ content of the exhaust flow continuously, intermittently or upon demand from the first control unit. The first control unit is adapted to receiving said signals containing a prevailing $NO_x$ content of the exhaust flow upstream of the catalyst.

A second $NO_x$ sensor 255 is provided adjacent to the second exhaust passage 251 and is adapted to measuring a prevailing $NO_x$ content in the second exhaust passage. It is adapted to measuring a prevailing $NO_x$ content in the second exhaust passage downstream of the SCR catalyst 260. This second $NO_x$ sensor is arranged for communication with the first control unit 200 via a link 256. It is adapted to sending signals to the first control unit which contain information about a prevailing $NO_x$ content of the exhaust flow continuously, intermittently or upon demand from the first control unit. The first control unit is adapted to receiving said signals containing a prevailing $NO_x$ content of the exhaust flow downstream of the catalyst.

A temperature sensor 265 is provided adjacent to the SCR catalyst 260 and is adapted to measuring a prevailing temperature of the catalyst. It may be adapted to measuring a prevailing temperature of the exhaust flow in the catalyst. Alternatively it may be adapted to measuring a temperature of a vaporisation module which is part of the catalyst. It is arranged for communication with the first control unit 200 via a link 266. It is adapted to sending signals to the first control unit which contain information about a prevailing temperature in its monitoring region continuously, intermittently or upon demand from the first control unit. The first control unit is adapted to receiving said signals containing a prevailing temperature in the monitoring region pertaining to the catalyst.

The first control unit 200 is arranged for communication with the second control unit 210, as also depicted in FIG. 2*a* above.

The first control unit 200 is adapted to receiving signals which contain information about prevailing temperatures of the SCR catalyst 260 and $NO_x$ contents upstream and downstream of the catalyst continuously, intermittently or upon demand from the first control unit.

At an appropriate time before cleaning of the SCR system, the first control unit 200 is adapted to using stored operating routines to switch off the supply of reducing agent to the exhaust flow so that the SCR catalyst 260 is substantially emptied of vaporised reducing agent. It is further adapted, when appropriate, e.g. at a temperature of the SCR catalyst at which reducing agent crystals vaporise, to determining $NO_x$ contents of the exhaust flow upstream and downstream of the catalyst. It is further adapted, when appropriate, e.g. at a temperature of the SCR catalyst at which reducing agent crystals do not vaporise, to determining $NO_x$ contents upstream and downstream of the catalyst.

The first control unit 200 may be adapted to using the first $NO_x$ sensor 245 to measure $NO_x$ contents upstream of the SCR catalyst 260. It may be adapted to using the second $NO_x$ sensor 255 to measure $NO_x$ contents downstream of the catalyst.

The first control unit 200 may be adapted to using a stored model to determine an $NO_x$ content upstream of the SCR catalyst 260. It may be adapted to using a stored model to determine an $NO_x$ content upstream of the catalyst on the basis of a prevailing operating state of the engine 230. An alternative determination of an $NO_x$ content upstream of the catalyst is thus made.

This modelled value representing an $NO_x$ content upstream of the SCR catalyst 260 may be used to arrive at a ratio K1 between respective $NO_x$ contents determined downstream and upstream of the catalyst at which reducing agent crystals do not vaporise.

This modelled value representing an $NO_x$ content upstream of the SCR catalyst 260 may be used to arrive at a ratio Kn between respective $NO_x$ contents determined downstream and upstream of the catalyst at which reducing agent crystals vaporise.

The first control unit 200 is further adapted to determining a ratio K1 between respective $NO_x$ contents measured downstream and upstream of said SCR catalyst 260 at a temperature at which reducing agent crystals do not vaporise. It is further adapted to raising the temperature of the exhaust flow in order to vaporise reducing agent crystals with a view to cleaning. It is further adapted to determining a ratio Kn between respective $NO_x$ contents measured downstream and upstream of the catalyst at which reducing agent crystals vaporise. It is further adapted to comparing said ratios K1 and Kn in order to decide whether reducing agent crystals have been removed to an intended extent. It is further adapted to conducting, when necessary, a further cycle of cleaning, determination and comparison. It is further adapted to effecting cleaning at a higher temperature than that at which said ratio Kn is determined and reducing agent crystals vaporise. It is further adapted to determining said ratio K1 at the temperature at which reducing agent crystals do not vaporise after initiation of temperature rise. It is further adapted to determining said ratio Kn at the temperature at which reducing agent crystals vaporise under predetermined conditions at each determination of said $NO_X$ contents. It is further adapted to conducting said cleaning over a predetermined period of time.

Figure 3:
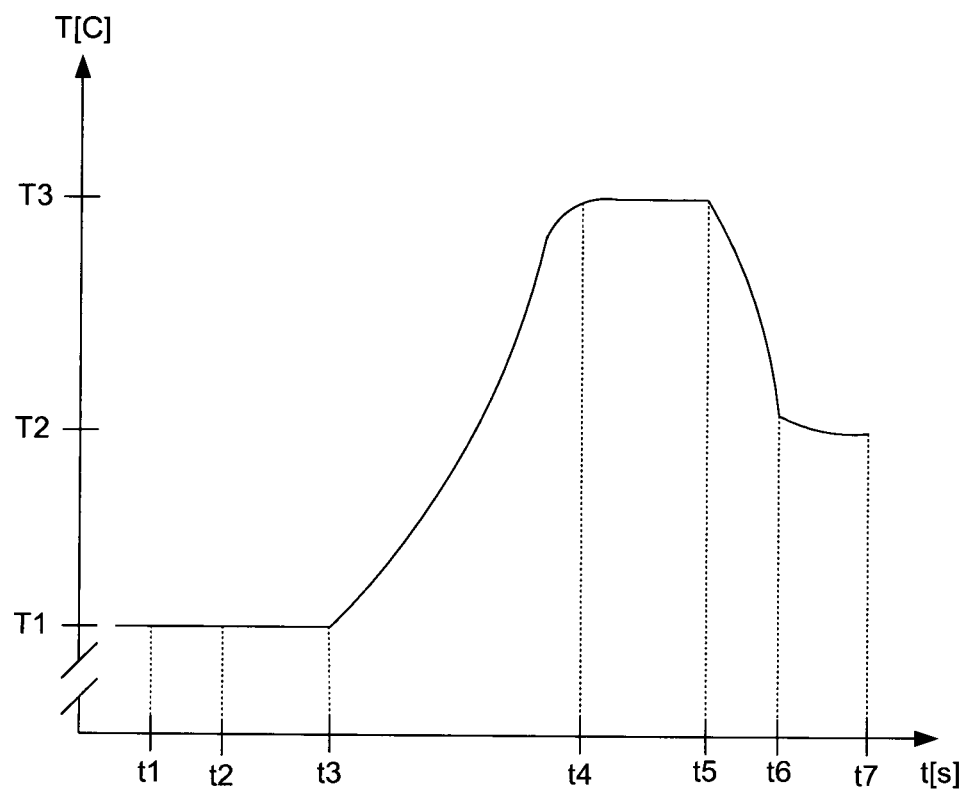
FIG. 3 is a schematic diagram according to an aspect of the invention.

FIG. 3 is a schematic diagram according to an embodiment of the invention.

It illustrates a temperature T of the SCR catalyst 260 as a function of time t, according to an embodiment of the invention.

When the presence of reducing agent crystals in the SCR system is detected, the burn-out method according to the invention may be initiated, e.g. by workshop staff at a workshop or service centre.

At a first time t1 the supply of reducing agent to the exhaust flow is switched off, with the result that the SCR catalyst 260 is substantially emptied of vaporised reducing agent. When the catalyst is substantially empty of vaporised reducing agent, the engine 240 is controlled in such a way as to reach a desired operating point such as to cause an exhaust flow which results in a temperature T1 of the catalyst. T1 may be a suitable temperature at which reducing agent crystals do not vaporise. It may be below 180 degrees Celsius, e.g. 120 or 150 degrees Celsius.

At a second time t2, prevailing respective $NO_X$ contents upstream and downstream of the SCR catalyst 260 are measured to serve as a basis for determining a ratio K1 between $NO_X$ contents measured downstream and upstream of said catalyst. K1 is a reference value for comparing ratios determined between $NO_X$ contents measured downstream and upstream of said catalyst at temperatures at which reducing agent crystals vaporise. It serves as a reference value for the ratio between $NO_X$ contents measured downstream and upstream of said catalyst when substantially no $NO_x$ reduction is taking place in said catalyst, since the measurements are made at a temperature T1 at which reducing agent crystals do not vaporise. This affords the advantage that the method according to the invention reduces or substantially completely compensates away the effects of any measurement errors in the respective measured $NO_X$ contents.

In an alternative version, the second time t2 is a time at which a prevailing operating point of the engine 240 is altered to an operating point which corresponds to, i.e. will lead to, a temperature T3 of the catalyst. Even if the temperature of an exhaust flow in the SCR system changes quickly, it will be substantially only at a third time t3 that a prevailing temperature of the SCR system begins to increase. Said measurements of $NO_X$ content and determination of said ratio K1 may take place repeatedly between time t2 and time t3. The effect of this is that the innovative burn-out method will be accurate so long as measurements are made at given operating points of the engine, in which case the measuring accuracy of the innovative method will be high.

The temperature T3 at which burning out of reducing agent crystals is effectively achieved is reached at time t4. It may be a suitable temperature for burn-out, e.g. 300 or 400 degrees Celsius. Burn-out may take place over a predetermined period defined by times t4 and t5. It therefore ceases at time t5.

A prevailing temperature is thereupon lowered from T3 to a temperature T2 by altering an operating point of the engine. T2 is reached at a sixth time t6 and is a temperature at which reducing agent crystals vaporise, e.g. within a range of 220-250 degrees Celsius.

At a seventh time t7, prevailing $NO_X$ contents upstream and downstream of the SCR catalyst 260 are measured to serve as a basis for determining a ratio Kn between $NO_X$ contents measured downstream and upstream of said catalyst. This ratio Kn may be compared with the ratio K1 determined between $NO_X$ contents measured downstream and upstream of said catalyst at temperatures at which reducing agent crystals do not vaporise.

When said ratio Kn is determined at a temperature at which reducing agent crystals vaporise, any remaining reducing agent crystals will at least partly vaporise and cause at least a certain $NO_x$ reduction in said catalyst. Said $NO_x$ reduction in said catalyst is reflected in said ratio Kn.

The method according to the invention makes it possible for a temperature of the SCR catalyst 260 to be raised intermittently, e.g. to T3, between times for determining respective $NO_X$ contents downstream and upstream of said catalyst at temperatures at which reducing agent crystals do not vaporise, e.g. at T2. Time-efficient burn-out of reducing agent crystals in the SCR system is thus achieved.

If it is determined that a difference between the ratios K1 and Kn determined at a temperature at which reducing agent crystals respectively vaporise and do not vaporise is greater than a predetermined threshold value TH, it may be determined that reducing agent crystals are still present in the SCR system, in which case a further temporary temperature rise, e.g. to T3, is effected with a view to cleaning. After said further burn-out, prevailing $NO_X$ contents upstream and downstream of the catalyst may be measured again, preferably in a vehicle state in which the engine is running at an operating point which results in a temperature T2 of the catalyst, whereupon a ratio Kn between $NO_X$ contents measured downstream and upstream of said catalyst is determined. This makes it possible to conduct a fresh comparison with the reference ratio K1 (associated with temperature T1) in order to decide whether reducing agent crystals have been removed to a desirable extent.

A quicker burn-out may be achieved by raising the temperature of the catalyst during repeated burn-outs of the SCR system. It should be noted that in one embodiment burning out may for example be conducted at T2, although this will take a longer time than at a higher temperature.

It is advantageous with regard to measurement accuracy that during repeated burn-outs each ratio Kn associated therewith between respective $NO_X$ contents measured downstream and upstream of said catalyst be determined at a same temperature at which reducing agent crystals vaporise, e.g. at T2. Any measuring error of the first $NO_x$ sensor 245 and the second $NO_x$ sensor 255 may thus be reduced.

In one advantageous embodiment, said reference ratio K1 is determined at a temperature T1 at which reducing agent crystals do not vaporise when an engine operating state, exhaust mass flow etc. are similar to those prevailing at the time of determining said ratio Kn at a temperature T2 at which reducing agent crystals vaporise. The thermal inertia in the system means that although the operating state corresponding to the time of determining said ratio Kn will in due course lead to a higher temperature than said T1, this embodiment determines said reference ratio K1 before the temperature can change to any great extent, i.e. before it deviates from said T1 by more than an appropriate value. Said reference ratio K1 in this embodiment is thus also determined at a temperature at which reducing agent crystals do not vaporise. The engine operating state, exhaust mass flow etc. will nevertheless be similar to those prevailing at the time when said ratio Kn is determined at a temperature T2 at which reducing agent crystals vaporise. This embodiment is also advantageous with regard to measurement accuracy.

A suitable number of cleaning cycles may be conducted according to the innovative method.

Figure 4:
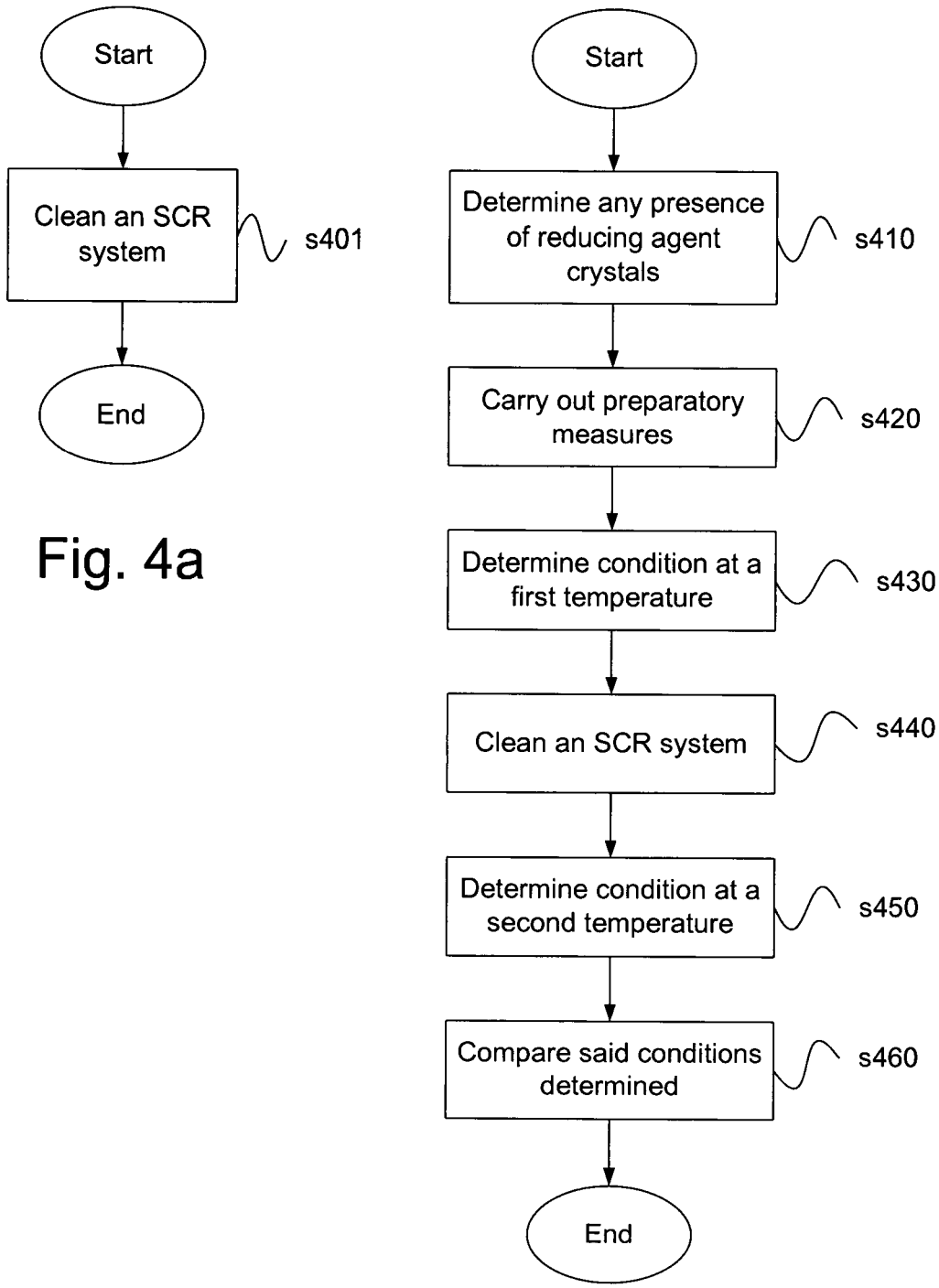
FIG. 4a is a schematic flowchart of a method according to an embodiment of the invention.
FIG. 4b is a more detailed schematic flowchart of a method according to an embodiment of the invention, and FIG. 5 schematically illustrates a computer according to an embodiment of the invention.

FIG. 4a is a schematic flowchart of a method for cleaning an SCR system whereby reducing agent is supplied to an exhaust flow upstream of an SCR catalyst, $NO_X$ contents of the exhaust flow are determined upstream and downstream of said catalyst and reducing agent crystals are removed by a high-temperature procedure, according to an embodiment of the invention. The method comprises a first step s401 comprising the steps of determining a ratio K1 between respective $NO_X$ contents determined downstream and upstream of said SCR catalyst at a temperature of said catalyst at which reducing agent crystals do not vaporise, raising the temperature of the exhaust flow in order to vaporise reducing agent crystals with a view to cleaning, determining a ratio Kn between respective $NO_X$ contents determined downstream and upstream of said SCR catalyst at a temperature of said catalyst at which reducing agent crystals vaporise, comparing said ratios K1 and Kn and using this comparison as a basis for deciding whether reducing agent crystals have been removed to an intended extent. The method ends after step s401.

FIG. 4b is a schematic flowchart of a method for cleaning an SCR system whereby reducing agent is supplied to an exhaust flow upstream of an SCR catalyst 260, $NO_X$ contents of the exhaust flow are determined upstream and downstream of said catalyst and reducing agent crystals are removed by a high-temperature procedure, according to an embodiment of the invention.

The method comprises a first step s410 comprising the step of determining any presence of reducing agent crystals in the SCR system, e.g. in a vaporisation module which is part of the SCR catalyst 260. Their presence in the SCR system may for example be determined by ocular inspection. It may for example be determined by a suitable detection procedure. Step s410 is followed by a step s420.

Method step s420 comprises the step of carrying out preparatory measures before cleaning of the SCR system. Such a measure might be to switch off the supply of reducing agent to the exhaust flow so that the catalyst is substantially emptied of vaporised reducing agent. Another such measure might be to control the engine's speed and an exhaust backpressure in order to achieve a desired operating point of the engine and hence a temperature T1 of the catalyst. There are various possible suitable ways of altering an operating point of the engine. Step s420 is followed by a step s430.

Method step s430 comprises the step of determining a condition at a first temperature T1. Step s430 comprises the step of measuring a prevailing $NO_X$ content upstream of the SCR catalyst. Step s430 comprises the step of measuring a prevailing $NO_X$ content downstream of the catalyst. Step s430 comprises the step of determining a ratio K1 between $NO_X$ contents measured upstream and downstream of said catalyst at a temperature T1 at which reducing agent crystals do not vaporise. Step s430 is followed by a step s440.

Method step s440 comprises the step of cleaning the SCR system. It may comprise the step of raising the temperature of the exhaust flow to T3 in order to vaporise reducing agent crystals with a view to cleaning. Said cleaning may be conducted over a predetermined period of time, e.g. 30 or 60 minutes. Step s440 is followed by a step s450.

Method step s450 comprises the step of determining a condition at a second temperature T2. Step s450 comprises the step of measuring a prevailing $NO_X$ content upstream of the catalyst. Step s450 comprises the step of measuring a prevailing $NO_X$ content downstream of the catalyst. Step s450 comprises the step of determining a ratio Kn between $NO_X$ contents measured downstream and upstream of said catalyst at a temperature T2 at which reducing agent crystals vaporise. Step s450 is followed by a step s460.

It should be noted that method steps s430 and s450 may be performed in reverse order, i.e. in one aspect of the invention the step of determining a ratio Kn between respective $NO_X$ contents measured downstream and upstream of said catalyst at a temperature T2 at which reducing agent crystals vaporise may take place before the step of determining a ratio K1 between $NO_X$ contents measured downstream and upstream of said catalyst at a temperature T1 at which reducing agent crystals do not vaporise.

Method step s460 comprises the step of comparing said ratios K1 and Kn determined respectively at temperatures T1 and T2, in order to decide whether reducing agent crystals have been removed to an intended extent. If a difference between said ratios K1 and Kn is not greater than a predetermined threshold value TH, it may be determined that reducing agent crystals have been removed to an intended extent. If the difference between said ratios K1 and Kn is greater than said predetermined threshold value TH, it may be determined that reducing agent crystals have not been removed to an intended extent, in which case method steps s440, s450 and s460 are performed again until substantially all reducing agent crystals have been vaporised away. The method ends after step s460.

Figure 5:
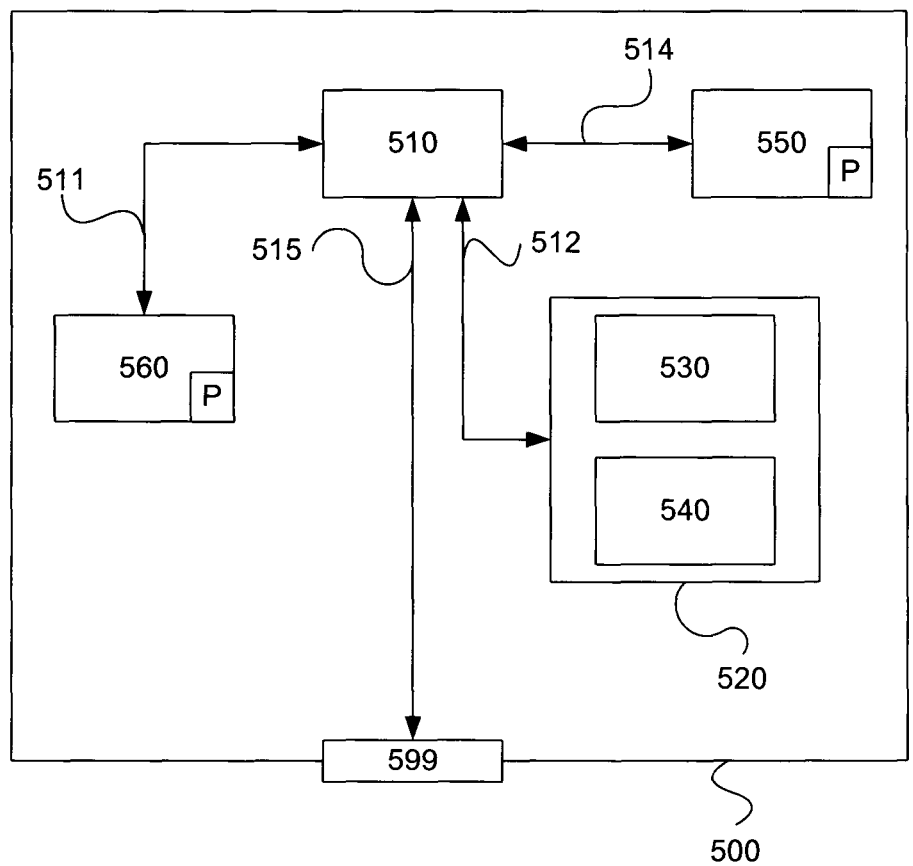

FIG. 5 is a diagram of a version of a device 500. The control units 200 and 210 described with reference to FIG. 2 may in one version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an ND converter, a time and date input and transfer unit, an event counter and an interruption controller (not depicted). The non-volatile memory 520 has also a second memory element 540.

A proposed computer programme P comprises routines for cleaning an SCR system, according to the innovative method. It may stored in an executable form or in compressed form in a memory 560 and/or a read/write memory 550.

The programme P comprises routines for determining a ratio K1 between respective $NO_X$ contents determined downstream and upstream of said SCR catalyst 260 at a temperature of said catalyst at which reducing agent crystals do not vaporise. It comprises routines for raising the temperature of the exhaust flow in order to vaporise reducing agent crystals with a view to cleaning. It comprises routines for determining a ratio Kn between respective $NO_X$ contents determined downstream and upstream of said catalyst at a temperature of said catalyst at which reducing agent crystals vaporise. It comprises routines for comparing said ratios K1 and Kn and using this comparison as a basis for deciding whether reducing agent crystals have been removed to an intended extent. It comprises routines for conducting, when a need is determined, a further cycle of cleaning, determination and comparison. It comprises routines for conducting cleaning at a higher temperature than that at which said ratio Kn is determined and reducing agent crystals vaporise. It comprises routines for determining said ratio K1 at the temperature at which reducing agent crystals do not vaporise after initiation of temperature rise. It comprises routines for determining said ratio Kn at the temperature at which reducing agent crystals vaporise under predetermined conditions at each determination of said $NO_X$ contents. It comprises routines for conducting said cleaning over a predetermined period of time. It may comprise routines for using a stored model to calculate an $NO_X$ content upstream of said catalyst at a temperature at which reducing agent crystals do not vaporise and at a temperature at which they do vaporise.

Where the data processing unit 510 is described as performing a certain function, it means that it conducts a certain part of the programme stored in the memory 560, or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is adapted to communicating with the data processing unit via a data bus 514. The data port 599 may for example have the links 246, 256, 266, 290 and 293 connected to it (see FIG. 2 and FIG. 3).

When data are received on the data port 599, they are stored temporarily in the second memory element 540. When input data received have been temporarily stored, the data processing unit 510 is prepared to effect code execution as described above. In one version, signals received on the data port contain information about a prevailing $NO_X$ content upstream of the SCR catalyst. In one version, signals received on the data port contain information about a prevailing $NO_X$ content downstream of the catalyst. In one version, signals received on the data port contain information about a prevailing temperature of the catalyst. In one version, signals received on the data port contain information about a prevailing pressure of the reducing agent in the second line 272. The signals received on the data port may be used by the device 500 to run the SCR system. The signals received on the data port may be used by the device 500 to decide whether reducing agent crystals have been removed to an intended extent according to an aspect of the invention.

Parts of the methods herein described may be conducted by the device 500 by means of the data processing unit 510 which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive, nor to restrict the invention to the variants described. Many modifications and variations will obviously suggest themselves to one skilled in the art. The embodiments have been chosen and described in order best to explain the principles of the invention and their practical applications and thus make it possible for one skilled in the art to understand the invention for different embodiments and with the various modifications appropriate to the intended use.

The invention claimed is:

1. A method for cleaning an SCR system that supplies reducing agent to an exhaust flow upstream of an SCR catalyst, the method comprising:
   determining, as a first ratio, a ratio between an $NO_X$ content of the exhaust flow determined downstream of the SCR catalyst and an $NO_X$ content of the exhaust flow determined upstream of the SCR catalyst at a temperature of the SCR catalyst at which reducing agent crystals do not vaporise; then
   transmitting instructions for raising the temperature of the exhaust flow in order to vaporise the reducing agent crystals with a view to cleaning; then
   determining, as a second ratio, a ratio between the $NO_X$ content determined downstream of the SCR catalyst and the $NO_X$ content determined upstream of the SCR catalyst at a second temperature of the SCR catalyst at which reducing agent crystals vaporise;
   comparing the first ratio with the second ratio for deciding whether reducing agent crystals have been removed to a predetermined threshold extent; and
   controlling, according to the decision, the SCR system for removing the reducing agent crystals.

2. A method according to claim 1, wherein, when the decision is that the reducing agent crystals have not been removed to the predetermined threshold extent, transmitting the instructions for raising the temperature of the exhaust flow.

3. A method according to claim 1, wherein, when the decision is that reducing agent crystals have not been removed to the predetermined threshold extent, the method further comprises transmitting an instruction for raising the temperature of the exhaust flow to a third temperature, the third temperature being higher than the second temperature at which the reducing agent crystals vaporise.

4. A method according to claim 1, wherein the step of determining the first ratio takes place after the transmitting of the instruction to raise the temperature.

5. A method according to claim 1, wherein the step of determining the second ratio takes place under predetermined conditions at each determination of the $NO_X$ contents.

6. A method according to claim 1, wherein the reducing agent is a urea-based reducing agent.

7. A computer program product comprising a non-volatile, non-transitory computer-readable medium incorporating a computer program comprising program code which, when the program code is executed in a computer or in an electronic control unit, causes the computer or the electronic control unit to effect the method according to claim 1, for causing the cleaning of an SCR system.

8. A method according to claim 1, wherein the reducing agent is a urea-based reducing agent is Adblue.

9. A method according to claim 1, wherein, when the decision is that the reducing agent crystals have not been removed to the predetermined threshold extent, the method further comprises:
   determining, as a third ratio, a ratio between the $NO_X$ content of the exhaust flow determined downstream of the SCR catalyst and the $NO_X$ content determined upstream of SCR catalyst; then
   determining, as a fourth ratio, a ratio between the $NO_X$ content to determine downstream of the SCR catalyst and the $NO_X$ content determined upstream of the SCR catalyst at a temperature of the SCR catalyst at which reducing agent crystals vaporise; and
   comparing the first ratio with the second ratio for deciding whether the reducing agent crystals have been removed to the predetermined threshold extent.

10. A controller device comprising an automated data processor configured to control cleaning of an SCR system having a reducing agent doser configured to supply reducing agent to an exhaust flow upstream of an SCR catalyst (260), the system having an $NO_X$ content determiner configured $NO_X$ content of the exhaust flow both upstream and downstream of the SCR catalyst, and the system configured to remove reducing agent crystals by a high-temperature procedure, the controller device comprising:

$NO_X$ ratio determination instructions configured to determine, automatically, as a first ratio, a ratio between a $NO_X$ content determined downstream and a $NO_X$ content determined upstream of the SCR catalyst at a first temperature of the SCR catalyst at which reducing agent crystals do not vaporise;

exhaust flow temperature control instructions configured to instruct raising the temperature of the exhaust flow to a level sufficient to vaporise the reducing agent crystals with a view to cleaning the SCR system;

the $NO_X$ ratio determination instructions configured to determine, as a second ratio, a ratio between $NO_X$ content determined downstream and $NO_X$ content determined upstream of said SCR catalyst at a second temperature of the SCR catalyst at which the reducing agent crystals vaporise; and $NO_X$ ratio comparator instructions configured to compare the first ratio with the second ratio, and to decide, based on this comparison, whether the reducing agent crystals have been removed to a predetermined threshold extent, and to control, according to the decision, the SCR system for removing reducing agent crystals.

11. A device according to claim 10, wherein the controller device is configured to instruct, when the decision is that the reducing agent crystals have not been removed to the predetermined threshold extent, a further cycle of raising the temperature of the exhaust gas flow.

12. A device according to claim 10, comprising wherein the controller device is configured to transmit, when the decision is that the reducing agent crystals have not been removed to the predetermined threshold extent, an instruction for conducting cleaning at a third temperature, the third temperature being higher than the second temperature at which the reducing agent crystals vaporise.

13. A device according to claim 10, wherein the controller device is configured to determine the first ratio after initiation of the temperature rise.

14. A device according to claim 10, wherein the controller device is configured to determine the second ratio under predetermined conditions at each determination of the $NO_X$ contents.

15. A device according to claim 10, wherein the reducing agent is a urea-based reducing agent.

16. A device according to claim 10, wherein the SCR system reducing agent removal is conducted over a predetermined period of time (t4-t5).

17. A motor vehicle provided comprising a device according to claim 10.

18. A motor vehicle according to claim 17, wherein the vehicle is a truck, a bus or a car.

* * * * *